United States Patent
Hu et al.

(10) Patent No.: US 10,769,645 B2
(45) Date of Patent: Sep. 8, 2020

(54) METHOD AND DEVICE FOR CALCULATING CUSTOMER TRAFFIC VOLUME

(71) Applicant: Hangzhou Hikvision Digital Technology Co., LTd., Zhejiang (CN)

(72) Inventors: Minghui Hu, Zhejiang (CN); Anqiang Du, Zhejiang (CN)

(73) Assignee: Hangzhou Hikvision Digital Technology Co., Ltd. (CN)

(*) Notice: Subject to any disclaimer, the term of this patent is extended or adjusted under 35 U.S.C. 154(b) by 409 days.

(21) Appl. No.: 15/573,755

(22) PCT Filed: May 10, 2016

(86) PCT No.: PCT/CN2016/081595
§ 371 (c)(1),
(2) Date: Nov. 13, 2017

(87) PCT Pub. No.: WO2016/180323
PCT Pub. Date: Nov. 17, 2016

(65) Prior Publication Data
US 2018/0130074 A1 May 10, 2018

(30) Foreign Application Priority Data

May 12, 2015 (CN) .......................... 2015 1 0242960
Jun. 9, 2015 (CN) .......................... 2015 1 0313952

(51) Int. Cl.
*G06Q 30/02* (2012.01)
*G06M 11/00* (2006.01)
(Continued)

(52) U.S. Cl.
CPC ......... *G06Q 30/0201* (2013.01); *G06M 11/00* (2013.01); *G07C 9/00* (2013.01);
(Continued)

(58) Field of Classification Search
CPC ....... H04W 4/33; H04W 4/029; H04W 4/021; G06M 11/00; G07C 9/00
See application file for complete search history.

(56) References Cited

U.S. PATENT DOCUMENTS

2008/0114633 A1  5/2008  Wolf et al.
2013/0294646 A1  11/2013  Shaw
(Continued)

FOREIGN PATENT DOCUMENTS

CN       1932843       3/2007
CN       101303727     11/2008
(Continued)

OTHER PUBLICATIONS

CN Office Action dated Apr. 28, 2018; Application No. 201510313952.3; 12 pages.
(Continued)

*Primary Examiner* — Edward Park
(74) *Attorney, Agent, or Firm* — Mark. E. Bandy; Rankin, Hill & Clark LLP (57) ABSTRACT

A statistical method and device for customer flow volume. The method comprises: obtaining video image information in a preset monitoring area; performing video analysis on the video image information and determining a movement direction of a first target person appearing in the preset monitoring area according to an analysis result; obtaining, through statistics, incoming or outgoing customer flow volume of the actual detection area according to the determined movement direction of the first target person; reading a first terminal identifier, detected by a WiFi detector, of a WiFi terminal apparatus carried by the first target person; judging whether the first terminal identifier is present in a preset terminal identifier database for non-customer personnel; if so, decreasing the incoming or outgoing customer
(Continued)

flow volume by 1; otherwise, making no change to the incoming or outgoing customer flow volume.

12 Claims, 2 Drawing Sheets

(51) Int. Cl.
 *H04W 4/33* (2018.01)
 *H04W 4/029* (2018.01)
 *G07C 9/00* (2020.01)
 *H04W 4/021* (2018.01)

(52) U.S. Cl.
 CPC ........... *H04W 4/021* (2013.01); *H04W 4/029* (2018.02); *H04W 4/33* (2018.02)

(56) References Cited

U.S. PATENT DOCUMENTS

| | | | |
|---|---|---|---|
| 2014/0211986 A1 | 7/2014 | Dryer et al. | |
| 2015/0006213 A1 | 1/2015 | Heier | |
| 2015/0317517 A1* | 11/2015 | Quan | ................. G06K 9/00778 348/143 |

FOREIGN PATENT DOCUMENTS

| | | |
|---|---|---|
| CN | 102238584 | 11/2011 |
| CN | 102737336 | 10/2012 |
| CN | 202815960 | 3/2013 |
| CN | 103391432 | 11/2013 |
| CN | 103456054 | 12/2013 |
| CN | 103473840 | 12/2013 |
| CN | 104021599 | 9/2014 |
| CN | 104504112 | 4/2015 |
| CN | 104601966 | 5/2015 |
| EP | 2426642 A1 | 3/2012 |
| JP | 4963297 | 6/2012 |

OTHER PUBLICATIONS

International Search Report dated Jul. 26, 2016; Application No. PCT/CN2016/081595; 4 pages.
Extended Search Report dated Oct. 10, 2018; Application 16792173.3; 10 pages.
EP Office Action dated Mar. 19, 2020 ; Application No. EP16792173.3; 10 pages.

* cited by examiner

METHOD AND DEVICE FOR CALCULATING CUSTOMER TRAFFIC VOLUME

The present application claims the priority to a Chinese patent application No. 201510242960.3 filed with the State Intellectual Property Office of People's Republic of China on May 12, 2015 and entitled "statistical method and device for customer flow volume" and a Chinese patent application No. 201510313952.3 filed with the State Intellectual Property Office of People's Republic of China on Jun. 9, 2015 and entitled "statistical method and device for customer flow volume", which are incorporated herein by reference in their entireties.

TECHNICAL FIELD

The present application relates to the field of monitoring cameras, and in particular to a statistical method and device for customer flow volume.

BACKGROUND

In the related art, when obtaining, through statistics, customer flow volume entering/exiting a certain site, a webcam IPC for obtaining, through statistics, the video customer flow volume generally requires to judge whether a certain person in a video is entering or exiting according to the movement direction of the person, thereby it is possible to obtain the number of incoming persons and the number of outgoing persons of a certain area and then obtain the number of the remaining persons by subtracting the number of outgoing persons from the number of incoming persons, wherein the accuracy rate of the number of incoming persons and the number of outgoing persons obtained using this technology can substantially reach more than 95%.

However, this technology lacks a further determination of personnel information, resulting in that the number of incoming persons is increased by 1 as long as someone enters, the number of outgoing persons is increased by 1 as long as someone exits, and it is unable to identify who enters or exits. In an application for obtaining, through statistics, customer flow volume in a store, if clerks of the store pass the doorway again and again, the number of incoming persons and the number of outgoing persons will continuously increase in the customer flow volume statistics, resulting in a distortion of statistical results of the customer flow volume, i.e. there is a deviation between the obtained statistical value and the actual customer flow volume, and finally the managers of the store cannot make correct decisions due to the existing obvious deviation in statistical information of the obtained customer flow volume.

With respect to the above problem, no effective solution has been proposed at present.

SUMMARY OF THE INVENTION

The embodiments of the present application provide a statistical method and device for customer flow volume in order to at least solve the technical problem that statistical results are not accurate due to inability of further determining personnel information of a person on which a statistical operation is performed.

According to an aspect of an embodiment of the present application, a statistical method for customer flow volume is provided, which includes: obtaining video image information in a preset monitoring area; performing video analysis on the video image information and determining a movement direction of a first target person appearing in the preset monitoring area according to an analysis result, the movement direction being a direction of entering an actual detection area of a wireless detector or a direction of exiting the actual detection area, wherein the actual detection area covers the preset monitoring area obtaining, through statistics, incoming customer flow volume or outgoing customer flow volume of the actual detection area according to the determined movement direction of the first target person, reading a first terminal identifier, detected by a WiFi detector, of a WiFi terminal apparatus carried by the first target person; judging whether the first terminal identifier is present in a preset terminal identifier database for non-customer personnel; if so, decreasing the incoming customer flow volume or the outgoing customer flow volume by 1; otherwise, making no change to the incoming customer flow volume or the outgoing customer flow volume.

According to an aspect of an embodiment of the present application, a statistical method for customer flow volume is provided, which includes: obtaining video image information in a preset monitoring area; performing video analysis on the video image information and determining a movement direction of a first target person appearing in the preset monitoring area according to an analysis result, the movement direction including an incoming direction or an outgoing direction; obtaining a first terminal identifier of a WiFi terminal apparatus carried by the first target person through a WiFi detector, wherein an actual detection area of the WiFi detector covers the preset monitoring area; judging whether the first terminal identifier is present in a preset terminal identifier database for non-customer personnel; if not, increasing incoming customer flow volume or outgoing customer flow volume by 1 according to the movement direction of the first target person; if so, making no change to the incoming customer flow volume or the outgoing customer flow volume.

According to an aspect of an embodiment of the present application, a statistical method for customer flow volume is provided, which includes: obtaining a current statistical value of customer flow volume in a preset monitoring area, the current statistical value of the customer flow volume being a difference between the number of the detected persons appearing in the preset monitoring area and the number of the detected persons disappearing from the preset monitoring area so far; judging whether the detected persons appearing in the preset monitoring area and the detected persons disappearing from the preset monitoring area meet a preset attribute condition; if it is judged that the detected persons appearing in the preset monitoring area and the detected persons disappearing from the preset monitoring area meet the preset attribute condition, adjusting the current statistical value of the customer flow volume to obtain an adjusted value of the customer flow volume; and taking the adjusted value of the customer flow volume as the actual value of the customer flow volume in the preset monitoring area.

According to another aspect of an embodiment of the present application, a statistical device for customer flow volume is provided, which includes: an obtaining unit for obtaining a current statistical value of customer flow volume in a preset monitoring area, the current statistical value of the customer flow volume being a difference between the number of the detected persons appearing in the preset monitoring area and the number of the detected persons disappearing from the preset monitoring area so far; a judging unit for judging whether the detected persons appearing in the preset monitoring area and the detected persons disappearing from the preset monitoring area meet a preset attribute condition; an adjustment unit for, when it is judged that the detected persons appearing in the preset monitoring area and the detected persons disappearing from the preset monitoring area meet the preset attribute condition, adjusting the current statistical value of the customer flow volume to obtain an adjusted value of the customer flow volume; and a determining unit for taking the adjusted value of the customer flow volume as the actual value of the customer flow volume in the preset monitoring area.

An embodiment of the present application further provides a statistical device for customer flow volume including:

a first video image obtaining unit for obtaining video image information in a preset monitoring area;

a first movement direction determining unit for performing video analysis on the video image information and determining a movement direction of a first target person appearing in the preset monitoring area according to an analysis result, the movement direction being a direction of entering an actual detection area of a wireless detector or a direction of exiting the actual detection area, wherein the actual detection area covers the preset monitoring area:

a first statistical unit for customer flow volume, for obtaining, through statistics, incoming customer flow volume or outgoing customer flow volume of the actual detection area according to the determined movement direction of the first target person;

a first terminal identifier reading unit for reading a first terminal identifier, detected by a WiFi detector, of a WiFi terminal apparatus carried by the first target person;

a first judging unit for judging whether the first terminal identifier is present in a preset terminal identifier database for non-customer personnel, if so, decreasing the incoming customer flow volume or the outgoing customer flow volume by 1; otherwise, making no change to the incoming customer flow volume or the outgoing customer flow volume.

An embodiment of the present application further provides a statistical device for customer flow volume including:

a second video image obtaining unit for obtaining video image information in a preset monitoring area;

a second movement direction determining unit for performing video analysis on the video image information and determining a movement direction of a first target person appearing in the preset monitoring area according to an analysis result, the movement direction including an incoming direction or an outgoing direction;

a second terminal identifier reading unit for obtaining a first terminal identifier of a WiFi terminal apparatus carried by the first target person through a WiFi detector, wherein an actual detection area of the WiFi detector covers the preset monitoring area;

a second judging unit for judging whether the first terminal identifier is present in a preset terminal identifier database for non-customer personnel; if not, increasing incoming customer flow volume or outgoing customer flow volume by 1 according to the movement direction of the first target person; if so, making no change to the incoming customer flow volume or the outgoing customer flow volume.

An embodiment of the present application further provides a storage medium, wherein the storage medium is used for storing an application program for implementing any one of the statistical methods for customer flow volume provided by the embodiments of the present application.

An embodiment of the present application further provides an application program, wherein the application program is used for implementing any one of the statistical methods for customer flow volume provided by the embodiments of the present application when in operation. An embodiment of the present application further provides an electronic apparatus, wherein the electronic apparatus includes: a processor, a memory, a communication interface and a bus; the processor, the memory and the communication interface being connected and communicated with each other via the bus; the memory storing an executable program code; the processor executing a program corresponding to the executable program code by reading the executable program code stored in the memory, so as to implement any one of the statistical methods for customer flow volume provided by the embodiments of the present application.

Any statistical method for customer flow volume provided by the embodiments of the present application can effectively prevent such cases that the number of incoming persons and the number of outgoing persons continuously increase in the customer flow volume statistics and the statistical result distorts because clerks of the store pass the doorway again and again, so that the obtained statistical number really represents the number of incoming and outgoing customers. That is, by means of embodiments of the present application, it is possible to achieve the object of further determining personal information of a person on which a statistical operation is performed, thereby eliminating the influence of the person meeting a preset attribute condition on the statistical result, and achieving the technical effect of improving the accuracy of the statistical result.

In an embodiment of the present application, by means of providing a WiFi probe in a webcam, by obtaining a current statistical value of the customer flow volume in the preset monitoring area, the current statistical value of the customer flow volume being a difference between the number of the detected persons appearing in the preset monitoring area and the number of the detected persons disappearing from the preset monitoring area so far; judging whether the detected persons appearing in the preset monitoring area and the detected persons disappearing from the preset monitoring area meet a preset attribute condition; if it is judged that the detected persons appearing in the preset monitoring area and the detected persons disappearing from the preset monitoring area meet the preset attribute condition, adjusting the current statistical value of the customer flow volume to obtain an adjusted value of the customer flow volume; and taking the adjusted value of the customer flow volume as the actual value of the customer flow volume in the preset monitoring area, the object of further determining personal information of a person on which a statistical operation is performed is achieved, thereby eliminating the influence of the person meeting a preset attribute condition on the statistical result, and achieving the technical effect of improving the accuracy of the statistical result, and then solving the technical problem of an inaccurate statistical result due to inability of further determining personal information of a person on which a statistical operation is performed.

BRIEF DESCRIPTION OF DRAWINGS

In order to describe the technical solutions of the embodiments in the present application and in the prior art, the drawings required to be used in the embodiments and the prior art will be introduced simply. Obviously, the drawings described below are for only some embodiments of the present application, and other drawings can be obtained by a person skilled in the art based on these drawings without any creative work.

DETAILED DESCRIPTION OF THE INVENTION

In order to make the objects, technical solutions and advantages of the present application more clear, the present application is further described in detail below with reference to the drawings and embodiments. Obviously, the described embodiments are only a part of the embodiments of the present application, rather than all the embodiments. Based on the embodiments in the present application, all the other embodiments obtained by a person skilled in the art without any creative work fall within the protection scope of the present application.

It should be noted that the terms such as "first". "second" or the like in the description, claims and the above drawings of the present application are intended to distinguish similar objects, but are not necessarily used to describe a specific order or sequence. It should be appreciated that the data used in such a way can be exchanged if appropriate, such that the embodiments described herein can be implemented in an order other than those shown or described herein. In addition, the terms "include". "have" and any variant thereof are intended to cover a non-exclusive inclusion, such that processes, methods, systems, articles or devices including a series of steps or units are not limited to those steps or units specifically listed, and can include other steps or units not specifically listed or other steps or units intrinsic to these processes, methods, systems, articles, or devices.

Embodiment 1

According to an embodiment of the present application, an embodiment of a statistical method for customer flow volume is provided. It should be noted that the steps shown in the flow chart of the drawings can be executed in computer systems activated by a set of computer executable instructions and the like, and although a logic order is shown in the flow charts, it is possible to execute the shown or described steps in a different order in some cases.

In the embodiment of the present application, a WiFi detector refers to an element or a module capable of detecting WiFi signals, such as a WiFi probe. A WiFi terminal apparatus can particularly be a mobile terminal with a WiFi module, and the WiFi module can be a WiFi module at the user side, such as a general WiFi module used in a mobile terminal, a notebook, a tablet PC or the like. Based on the WiFi module, the WiFi terminal apparatus transmits a WiFi signal periodically, and the WiFi signal will carry a unique identifier information of the WiFi terminal apparatus.

Figure 1:
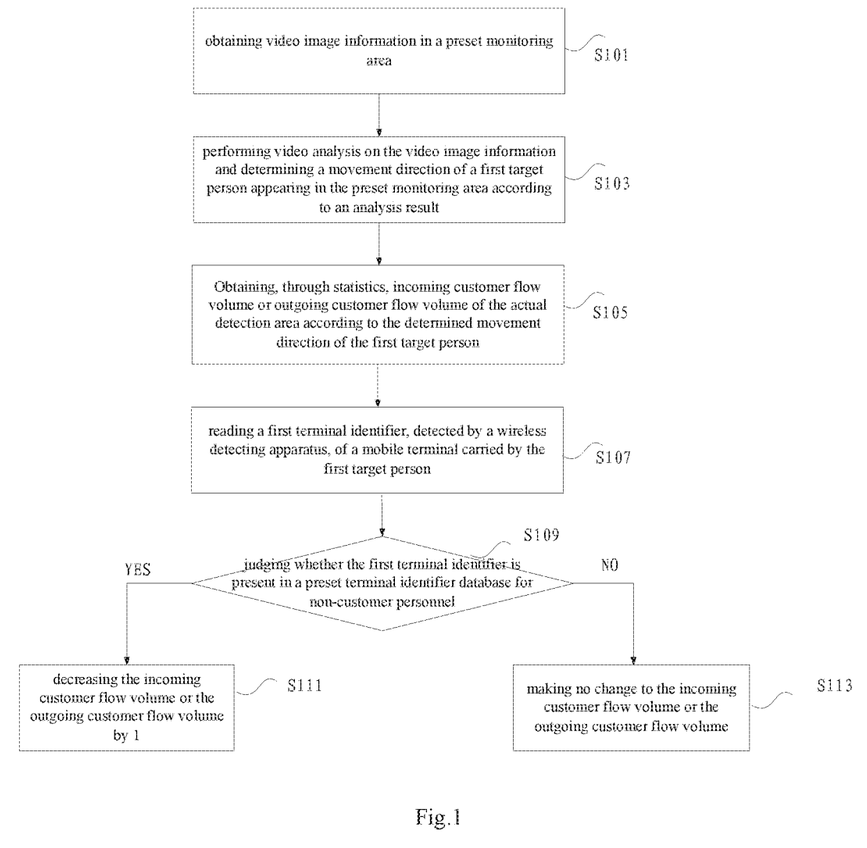
FIG. 1 is a flow chart of an optional statistical method for customer flow volume according to an embodiment of the present application.

FIG. 1 is a flow chart of an optional statistical method for customer flow volume according to an embodiment of the present application. As shown in FIG. 1, the method includes the steps of:

Step S101, obtaining video image information in a preset monitoring area:

Step S103, performing video analysis on the video image information and determining a movement direction of a first target person appearing in the preset monitoring area according to an analysis result, the movement direction being a direction of entering an actual detection area of a wireless detector or a direction of exiting the actual detection area, wherein the actual detection area covers the preset monitoring area:

Step S105, obtaining, through statistics, incoming customer flow volume or outgoing customer flow volume of the actual detection area according to the determined movement direction of the first target person.

It should be noted that, in an optional implementation of the above step S101 to step S105, it is possible to monitor and obtain, through statistics, the customer flow volume in a preset monitoring area by means of pure video technology of webcam IPCs in order to obtain the statistical value of customer flow of the current preset monitoring area, and the statistical value of customer flow is the incoming customer flow volume or outgoing customer flow volume. Wherein IPC can include a video capturing module and a DSP computing module. The video capture module is used for obtaining video image information of a real time video in the preset monitoring area and can perform simple image processing on the video image information such as highlighting processing to improve contrast, in order to improve image definitions and detection precisions of persons; The DSP computing module is used for performing mode recognition on the captured video image information to recognize all the persons appearing in the video (it can be any one of the first target persons) and the movement directions thereof, and determine whether they enter the preset area or exit the preset area according to their movement directions.

Step S107, reading a first terminal identifier, detected by a WiFi detector, of a WiFi terminal apparatus carried by the first target person. The terminal identifier of the WiFi terminal apparatus in the embodiment is not limited to data uniquely identifying the WiFi terminal apparatus such as the MAC address, IP address, manufacture serial number of the WiFi terminal apparatus. The WiFi detector can be a WiFi detector built in a webcam, or can also be a WiFi detector deployed apart from a webcam.

It should be noted that, in an optional scheme of the present application, while a webcam IPC monitors and obtains, through statistics, the customer flow volume, a WiFi detector associated with the webcam IPC detects information of a WiFi terminal apparatus carried by the target person entering the actual detection area, thereby further excluding unreasonable statistical results of the customer flow volume.

Step S109, judging whether the first terminal identifier is present in a preset terminal identifier database for non-customer personnel.

Step S111, if so, decreasing the incoming customer flow volume or the outgoing customer flow volume by 1.

Step S113, otherwise, making no change to the incoming customer flow volume or the outgoing customer flow volume.

Taking an IPC provided at a doorway of a store as an example, the above steps are set forth in detail below.

When being implemented, the IPC can perform intelligent analysis through video mode recognition by obtaining, through statistics, a video customer flow volume in order to obtain, through statistics, the number of persons entering and exiting a preset monitoring area. i.e. to obtain the current statistical value of the customer flow volume in the store, wherein the current statistical value of the customer flow volume in the store is a difference between the number of the detected customers appearing in the store and the number of the detected customers exiting the store so far; further, the IPC judges whether the detected persons appearing in the store and the detected persons exiting the store are clerks of the store; if so, the current statistical value of the customer flow volume is adjusted to obtain an adjusted value of the customer flow volume, and in particular, the current statistical value is decreased by 1 to obtain the adjusted value of the customer flow volume; and the adjusted value of the customer flow volume is taken as the actual value of the customer flow volume of the store, and the actual value is uploaded to a background server. It should be noted that, taking the IPC provided at a doorway of a store as an example, when being implemented, the IPC can obtain, through statistics, incoming customer flow volume or outgoing customer flow volume of an actual detection area, and then, the IPC judges whether the detected persons appearing in the store and the detected persons exiting the store are clerks of the store; if the detected person appearing in the store (i.e. the movement direction of the person is the direction of entering the actual detection area of a wireless detector) is a clerk of the store, the incoming customer flow volume is decreased by 1, otherwise, no change is made to the incoming customer flow volume; if the detected person exiting the store (i.e. the movement direction of the person is the direction of exiting the actual detection area) is a clerk of the store, the outgoing customer flow volume is decreased by 1, otherwise, no change is made to the outgoing customer flow volume.

By means of the above steps, in view that it is possible to further determine information of persons resulting in the customer flow volume in a preset monitoring area, it is not only possible to increase the number of incoming persons by 1 when someone enters and increase the number of outgoing persons by 1 when someone exists, but also to identify who enters or exits the preset area. In particular in the present application for obtaining, through statistics, the customer flow volume in a store, for example, the WiFi detector can be a WiFi probe, and the hardware modules thereof can include a communication module for providing a network access function for a preset area, receiving cellphone MAC white list information and the like issued by a management terminal, and uploading customer flow volume statistical data and video image data; a WiFi detection module for sensing and detecting whether a cellphone MAC address and the like appears, in particular, sensing the doorway and the inside of the store covered by the area; a storage module for storing cellphone MAC white list information and customer flow volume statistical data within a period of time. It should be noted that the above white list can be a list which records MAC address information of the WiFi apparatus in advance.

By means of the embodiment of the present application, which uses a manner of combining wireless sensing and video obtaining and determining to adjust the number of incoming persons and the number of outgoing persons within the preset monitoring area such as a store or the like and exclude the number of incoming persons and the number of outgoing persons which meet a preset attribute condition (for example, clerks or the like), it is ensured that the obtained statistical value of the customer flow volume is authentic and reliable.

It can be seen that, with the present application, it is possible to effectively prevent such cases that the number of incoming persons and the number of outgoing persons continuously increase in the customer flow volume statistics and the statistical result distorts because clerks of the store pass the doorway again and again, so that the obtained statistical number really represents the number of incoming and outgoing customers. That is, by means of embodiments of the present application, it is possible to achieve the object of further determining personal information of a person on which a statistical operation is performed, thereby eliminating the influence of the person meeting a preset attribute condition on the statistical result, and achieving the technical effect of improving the accuracy of the statistical result.

In an optional embodiment of the present application, the above step S101 to step S113 can be implemented by means of a webcam. In another optional embodiment of the present application, the above step S101 to step S113 can be implemented by means of a server. It should be emphasized that the server can be a background server, and can also be a management terminal.

Preferably, the WiFi detector can be provided in the webcam, or the WiFi detector can also be independent from the webcam.

In an optional embodiment, when the movement direction is a direction of exiting the actual detection area, before decreasing the outgoing customer flow volume by 1 accordingly, the method further includes: judging whether a time duration, for which the first terminal identifier detected by the WiFi detector has disappeared from the actual detection area, reaches a preset value; if so, performing the step of decreasing the outgoing customer flow volume by 1 accordingly.

Preferably, the WiFi detector in the above embodiment of the present application can include one of the following apparatuses: a WiFi probe, a RFID (Radio Frequency Identifier) apparatus, a NFC (Near Field Communication) apparatus, and a communication apparatus based on 433/866 protocol. Preferably, it can be an IPC with a WiFi probe function. In this way, it is possible to obtain, through statistics, the customer flow volume by video technology and to perform identifier recognition on a person carrying an apparatus with a WiFi module to adjust the current statistical value of the customer flow volume. It should be emphasized that the wireless detector can be the WiFi detector which obtains by detection the first terminal identifier of the WiFi terminal apparatus carried by the first target person, for example, a WiFi probe; of course, the wireless detector can be an apparatus different from the WiFi detector which obtains by detection the first terminal identifier of the WiFi terminal apparatus carried by the first target person. In an optional application scenario, if a target person enters and exits the actual detection area too frequently, the statistical result of the target person entering and exiting the actual detection area has redundancy. In order to delete the redundant data, after obtaining, through statistics, the incoming customer flow volume or the outgoing customer flow volume of the actual detection area, the present application further provides a scheme for deleting the redundant number of times entering or exiting the actual detection area, which can be implemented by the following steps:

first, reading the number of times of entering the actual detection area or the number of times of exiting the actual detection area for the first target person within a preset period of time. This step can determine the frequency of the target person entering and exiting the actual detection area;

then judging whether the number of times of entering the actual detection area or the number of times of exiting the actual detection area exceeds a preset threshold;

if so, subtracting the number of times of entering the actual detection area from the incoming customer flow volume to obtain the actual incoming customer flow volume or subtracting the number of times of exiting the actual detection area from the outgoing customer flow volume to obtain the actual outgoing customer flow volume;

otherwise, making no change to the incoming customer flow volume or the outgoing customer flow volume.

The redundant customer flow volume can be removed by means of the above scheme.

Taking an IPC provided at a doorway of a store as an example, the present application is set forth in combination with FIG. 2 in detail below.

Specifically, it is possible to register for the terminals 204 (for example, cellphones) of all the clerks in the store on the management terminal 202 of the store; if a clerk has a plurality of terminals in use simultaneously, all the terminals are required to be registered; when implemented, it is required that the clerks must keep the WiFi terminal apparatuses 204 carried by them in a WiFi-on state.

In addition, the webcam 206 with a WiFi probe can download the information of the registered terminals 204 of all the clerks through the management terminal 202 of the store to its own internal memory, and further, the IPC can save the information in the internal memory as a white list. When someone enters or exits the store, the webcam 206 with the WiFi probe can determine whether the person enters or exits by means of pure video analysis, thereby calculating the number of incoming persons and the number of outgoing persons. If a clerk of the store enters or exits, also, the webcam 206 with the WiFi probe will determine that there is someone incoming or outgoing, and will increase the number of incoming persons by 1 when the webcam 206 with the WiFi probe determines there is someone entering and increase the number of outgoing persons by 1 when the webcam 206 with the WiFi probe determines there is someone exiting.

In use, the webcam 206 with the WiFi probe can be set up at the doorway of the store, and the management terminal 202 of the store is set up at a machine room or inside the store. The management terminal 202 of the store is provided with a software platform, which can manage the basic information of the clerks, and at the same time, can be input with the MAC address information of the terminals 204 of the clerks and download and update the MAC address information to the webcam 206 with the WiFi probe. The webcam 206 with the WiFi probe can perform mode recognition by means of videos, analyze the movement direction of a person and determine whether he/she is incoming or outgoing, thereby update the current number of incoming persons and the current number of outgoing persons of the store. Meanwhile, the webcam 206 can also detect the MAC address information of all the emerging terminals, and match the white list inside the webcam 206; if it is found through retrieval that the MAC address information belongs to the white list, it is determined that a clerk is incoming or outgoing, and then the number of incoming persons and the number of outgoing persons obtained by video analysis are adjusted.

The WiFi of the terminals 204 of the clerks are required to keep on, thus, when a clerk enters the store, the webcam 206 with the WiFi probe will detect that a terminal MAC address appears and this terminal MAC address is contained in the white list of the webcam 206 with the WiFi probe. That is, the webcam 206 with the WiFi probe can judge that a clerk is entering the store at the moment based on the white list, thus, the webcam 206 with the WiFi probe will determine that the current number of the incoming person should not be counted, thereby adjusting the number of incoming persons and decreasing the number of incoming persons obtained by the video analysis and statistics by 1; in a same way, if the webcam 206 with the WiFi probe newly detects that a terminal MAC address appears but the MAC address does not belong to the white list, the webcam 206 with the WiFi probe will determine that the current number of the incoming person should be counted, thereby making no adjustment to the number of incoming persons.

Also, when there is a clerk outgoing, the webcam 206 with the WiFi probe will increase the number of outgoing persons by 1 by means of video analysis, and if it is found at the same time that the MAC address of the terminal 204 of a clerk cannot be detected in the latest period of time (for example, within 10 s), it determines that a clerk goes out, and adjusts the number of outgoing persons, i.e. decreasing the number of outgoing persons by 1. The webcam 206 with the WiFi probe uploads the adjusted actual value of the customer flow volume to a background server or a management terminal timely.

By means of the embodiment of the present application, the count of the store's clerks incoming or outgoing can be removed, and then a basically correct count only for customers entering and exiting the store can be obtained, such that the statistical result is more real and effective.

In addition, the aforesaid webcam IPC can be a WiFi probe IPC. i.e. a webcam fusing with WiFi probe technology, an apparatus provided with the function of wireless signal detection and capture, video capture, video analysis, target counting and network transmission, and it includes a WiFi probe. The WiFi probe can detect MAC address information of a WiFi apparatus.

It should be noted here that the present application can further provide a statistical method for customer flow volume, the implementation steps of which can be as follows:

obtaining video image information in a preset monitoring area; performing video analysis on the video image information and determining a movement direction of a first target person appearing in the preset monitoring area according to an analysis result, the movement direction including an incoming direction or an outgoing direction; obtaining a first terminal identifier of a WiFi terminal apparatus carried by the first target person through a WiFi detector, wherein an actual detection area of the WiFi detector covers the preset monitoring area; judging whether the first terminal identifier is present in a preset terminal identifier database for non-customer personnel, if not, increasing incoming customer flow volume or outgoing customer flow volume by 1 according to the movement direction of the first target person; if so, making no change to the incoming customer flow volume or the outgoing customer flow volume.

Wherein for the specific implementation of various steps in another statistical method for customer flow volume provided by the present application, reference can be made to the first statistical method for customer flow volume provided by the present application; in addition, the preferred steps in the first statistical method for customer flow volume provided by the present application is also be applicable to another statistical method for customer flow volume. It can be seen that, with another statistical method for customer flow volume, it is possible to effectively prevent such cases that the number of incoming persons and the number of outgoing persons continuously increase in the customer flow volume statistics and the statistical result distorts because clerks of the store pass the doorway again and again, so that the obtained statistical number really represents the number of incoming and outgoing customers. That is, by means of embodiments of the present application, it is possible to achieve the object of further determining personal information of a person on which a statistical operation is performed, thereby eliminating the influence of the person meeting a preset attribute condition on the statistical result, and achieving the technical effect of improving the accuracy of the statistical result.

Embodiment 2

According to an embodiment of the present application, an embodiment of a statistical method for customer flow volume is provided. It should be noted that the steps shown in the flow chart of the drawings can be executed in computer systems activated by a set of computer executable instructions and the like, and although a logic order is shown in the flow charts, it is possible to execute the shown or described steps in a different order herein in some cases.

Figure 3:
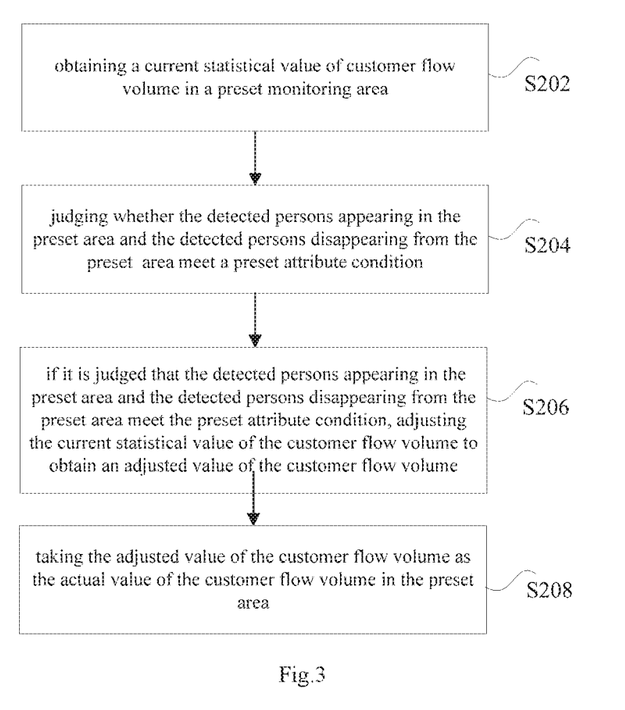
FIG. 3 is a flow chart of an optional statistical method for customer flow volume according to an embodiment of the present application.

FIG. 3 is a flow chart of an optional statistical method for customer flow volume of an embodiment of the present application. As shown in FIG. 3, the method includes the following steps:

S202, obtaining a current statistical value of customer flow volume in a preset monitoring area, the current statistical value of the customer flow volume being a difference between the number of the detected persons appearing in the preset monitoring area and the number of the detected persons disappearing from the preset monitoring area so far:

step S204, judging whether the detected persons appearing in the preset monitoring area and the detected persons disappearing from the preset monitoring area meet a preset attribute condition;

step S206, if it is judged that the detected persons appearing in the preset monitoring area and the detected persons disappearing from the preset monitoring area meet the preset attribute condition, adjusting the current statistical value of the customer flow volume to obtain an adjusted value of the customer flow volume; and step S208, taking the adjusted value of the customer flow volume as the actual value of the customer flow volume in the preset monitoring area.

When being implemented, it is possible to obtain the current statistical value of the customer flow volume in the preset monitoring area by means of pure video technology of webcam IPCs, wherein the IPC includes a video capture module and a DSP computing module; the video capture module is used for obtaining a real time video in the preset monitoring area and performing simple image processing on the real time video such as highlighting processing to improve contrast, in order to improve image definitions and detection precisions of persons; the DSP computing module is used for performing mode recognition on the captured real time video image information to recognize all the persons appearing in the video and the movement directions thereof, and determine whether they enter the preset area or exit the preset area according to their movement directions.

Taking an IPC provided at a doorway of a store as an example, the present application is set forth in detail below.

When being implemented, the IPC can perform intelligent analysis through video mode recognition in a way of obtaining, through statistics, a video customer flow volume in order to obtain, through statistics, the number of persons entering and exiting the preset area, i.e. to obtain the current statistical value of the customer flow volume in the store, wherein the current statistical value of the customer flow volume in the store is a difference between the number of the detected customers appearing in the store and the number of the detected customers exiting the store so far; further, the IPC judges whether the detected persons appearing in the store and the detected persons exiting the store are clerks of the store, if so, the current statistical value of the customer flow volume is adjusted to obtain an adjusted value of the customer flow volume, and in particular, the current statistical value is decreased by 1 to obtain the adjusted value of the customer flow volume; and the adjusted value of the customer flow volume is taken as the actual value of the customer flow volume of the store, and the actual value is uploaded to a background server.

By means of the above steps, in view that it is possible to further determine the information of persons resulting in the customer flow volume in the preset monitoring area, it is possible not only to increase the number of incoming persons by 1 when someone enters and increase the number of outgoing persons by 1 when someone exists, but also to identify who enters or exits the preset area. Particularly in the present application of obtaining, through statistics, the customer flow volume in a store, with the present application, it is possible to effectively prevent such cases that the number of incoming persons and the number of outgoing persons continuously increase in the customer flow volume statistics and the statistical result distorts because clerks of the store pass the doorway again and again, so that the obtained statistical number really represents the number of incoming and outgoing customers. That is, by means of the embodiment of the present application, it is possible to further determine the personal information of a person on which a statistical operation is performed, and then remove the effect of persons meeting a preset attribute condition on the statistical result, thereby achieving the technical effect of improving the accuracy of the statistical result.

Optionally, it is possible to judge whether the detected person appearing in the preset monitoring area and the detected person disappearing from the preset monitoring area meet a preset attribute condition by means of the following steps:

S2, judging whether a WiFi terminal apparatus carried by the detected person appearing in the preset monitoring area and a WiFi terminal apparatus carried by the detected person disappearing from the preset monitoring area are preset terminals, wherein if it is judged that the WiFi terminal apparatus carried by the detected person appearing in the preset monitoring area and the WiFi terminal apparatus carried by the detected person disappearing from the preset monitoring area are preset terminals, it indicates that the detected person appearing in the preset monitoring area and the detected person disappearing from the preset monitoring area meet a preset attribute condition; if it is judged that the WiFi terminal apparatus carried by the detected person appearing in the preset monitoring area and the WiFi terminal apparatus carried by the detected person disappearing from the preset monitoring area are not preset terminals, it indicates that the detected person appearing in the preset monitoring area and the detected person disappearing from the preset monitoring area do not meet the preset attribute condition.

Specifically, it is possible to use the terminals of the persons meeting the preset attribute condition as preset terminals, and register the information of these preset terminals in the management terminal of the aforesaid preset area, and when being implemented, it is possible to download the information of these preset terminals to the IPC.

By means of the embodiment of the present application, it is possible to determine whether the WiFi terminal apparatus carried by a person entering or exiting the preset area is a preregistered preset terminal in order to determine whether the person is a person meeting a preset attribute condition, thereby achieving the object of facilitating recognition.

Optionally, the step of judging whether the WiFi terminal apparatus carried by the detected person appearing in the preset monitoring area and the WiFi terminal apparatus carried by the detected person disappearing from the preset monitoring area are preset terminals, includes:

S4, judging whether the address information of the WiFi terminal apparatus carried by the detected person appearing in the preset monitoring area and the address information of the WiFi terminal apparatus carried by the detected person disappearing from the preset monitoring area are preset address information.

Specifically, it is possible to use the terminals of the persons meeting a preset attribute condition as a preset terminal, and register the address information (for example, MAC address information) of these preset terminals in the management terminal of the aforesaid preset area, and when being implemented, it is possible to download the address information (for example, MAC address information) of these preset terminals to the IPC.

By means of the embodiment of the present application, since it is easy to detect address information (for example, MAC address information) of terminals, the object of simplifying operation is achieved by determining whether the address information of a terminal carried by a person entering or exiting the preset area is preregistered address information of a preset terminal to determine whether the person is a person meeting the preset attribute condition.

Optionally, the step of judging whether the address information of the terminal apparatus carried by the detected person appearing in the preset monitoring area and the address information of the terminal apparatus carried by the detected person disappearing from the preset monitoring area are preset address information, includes:

S6, judging whether the address information of the terminal apparatus carried by the detected person appearing in the preset monitoring area and the address information of the terminal apparatus carried by the detected person disappearing from the preset monitoring area are preset address information by means of a WiFi detector.

For example, the WiFi detector can be a WiFi probe, and the hardware modules thereof can include a communication module for providing a network access function for a preset area, receiving cellphone MAC white list information and the like issued by a management terminal, and uploading customer flow volume statistical data and video image data a WiFi detection module for sensing and detecting whether a cellphone MAC address and the like appears, in particular, sensing the doorway and the inside of the store covered by the area; a storage module for storing cellphone MAC white list information and customer flow volume statistical data within a period of time. It should be noted that the above white list can be a list which records MAC address information of the WiFi apparatus in advance.

By means of the embodiment of the present application, which uses a manner of combining wireless sensing and video obtaining and determining to adjust the number of incoming persons and the number of outgoing persons within the preset monitoring area such as a store or the like and exclude the number of incoming persons and the number of outgoing persons which meet a preset attribute condition (for example, clerks or the like), it is ensured that the obtained statistical value of the customer flow volume is authentic and reliable.

Preferably, the WiFi detector in the above embodiment of the present application can include one of the following apparatuses: a communication device with a WiFi probe, a RFID communication device, a NFC communication device, and a communication device based on 433/866 protocol. Preferably, it can be an IPC with a WiFi probe. In this way, it is possible to obtain, through statistics, the customer flow volume by video technology and to perform identifier recognition on a person carrying an apparatus with a WiFi module to adjust the current statistical value of the customer flow volume.

Optionally, the step of obtaining a current statistical value of customer flow volume in a preset monitoring area, can include:

S8, obtaining a video image in the preset area;

S10, determining the movement directions of various persons in the preset monitoring area according to the obtained video image of the preset area;

S12, determining the number of the persons appearing in the preset monitoring area and the number of the persons disappearing from the preset monitoring area according to the determined movement directions of the various persons in the preset monitoring area; and S14, computing the current statistical value of the customer flow volume according the determined number of the persons appearing in the preset monitoring area and the determined number of the persons disappearing from the preset monitoring area.

Taking an IPC provided at a doorway of a store as an example, the present application is set forth in combination with FIG. 2 in detail below.

Specifically, it is possible to register for the terminals 204 (for example, cellphones) of all the clerks in the store on the management terminal 202 of the store; if a clerk has a plurality of terminals in use simultaneously, all the terminals are required to be registered; when implemented, it is required that the clerks must keep the WiFi terminal apparatuses 204 carried by them in a WiFi-on state.

In addition, the webcam 206 with a WiFi probe can download the information of the registered terminals 204 of all the clerks through the management terminal 202 of the store to its own internal memory, and further, the IPC can save the information in the internal memory as a white list. When someone enters or exits the store, the webcam 206 with the WiFi probe can determine whether the person enters or exits by means of pure video analysis, thereby calculating the number of incoming persons and the number of outgoing persons. If a clerk of the store enters or exits, also, the webcam 206 with the WiFi probe will determine that there is someone incoming or outgoing, and will increase the number of incoming persons by 1 when the webcam 206 with the WiFi probe determines there is someone entering and increase the number of outgoing persons by 1 when the webcam 206 with the WiFi probe determines there is someone exiting.

In use, the webcam 206 with the WiFi probe can be set up at the doorway of the store, and the management terminal 202 of the store is set up at a machine room or inside the store. The management terminal 202 of the store is provided with a software platform, which can manage the basic information of the clerks, and at the same time, can be input with the MAC address information of the terminals 204 of the clerks and download and update the MAC address information to the webcam 206 with the WiFi probe. The webcam 206 with the WiFi probe can perform mode recognition by means of videos, analyze the movement direction of a person and determine whether he/she is incoming or outgoing, thereby update the current number of incoming persons and the current number of outgoing persons of the store. Meanwhile, the webcam 206 can also detect the MAC address information of all the emerging terminals, and match the white list inside the webcam 206; if it is found through retrieval that the MAC address information belongs to the white list, it is determined that a clerk is incoming or outgoing, and then the number of incoming persons and the number of outgoing persons obtained by video analysis are adjusted.

The WiFi of the terminals 204 of the clerks are required to keep on, thus, when a clerk enters the store, the webcam 206 with the WiFi probe will detect that a terminal MAC address appears and this terminal MAC address is contained in the white list of the webcam 206 with the WiFi probe. That is, the webcam 206 with the WiFi probe can judge that a clerk is entering the store at the moment based on the white list, thus, the webcam 206 with the WiFi probe will determine that the current number of the incoming person should not be counted, thereby adjusting the number of incoming persons and decreasing the number of incoming persons obtained through video analysis and statistics by 1; in a same way, if the webcam 206 with the WiFi probe newly detects that a terminal MAC address appears but the MAC address does not belong to the white list, the webcam 206 with the WiFi probe will determine that the current number of the incoming person should be counted, thereby making no adjustment to the number of incoming persons.

Also, when there is a clerk outgoing, the webcam 206 with the WiFi probe will increase the number of outgoing persons by 1 by means of video analysis, and if it is found at the same time that the MAC address of the terminal 204 of a clerk cannot be detected in the latest period of time (for example, within 10 s), it determines that a clerk goes out, and adjusts the number of outgoing persons, i.e. decreasing the number of outgoing persons by 1. The webcam 206 with the WiFi probe uploads the adjusted actual value of the customer flow volume to a background server or a management terminal timely.

Figure 2:
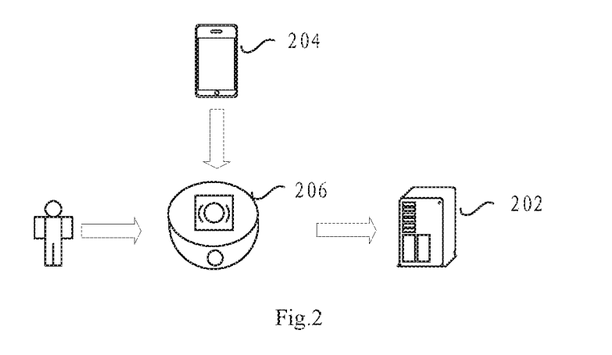
FIG. 2 is a flow chart of an optional statistical method for customer flow volume according to an embodiment of the present application.

It should be emphasized that when being implemented, taking an IPC provided at a doorway of a store as an example and combining with FIG. 2, the webcam 206 with the WiFi probe can perform intelligent analysis through video mode recognition in a way of obtaining, through statistics, video customer flow volume in order to obtain, through statistics, the number of persons entering and exiting the preset area, i.e. to obtain the current statistical value of the customer flow volume in the store, wherein the current statistical value of the customer flow volume in the store is a difference between the number of the detected customers appearing in the store and the number of the detected customers exiting the store so far; further, the webcam 206 with the WiFi probe judges whether the detected persons appearing in the store and the detected persons exiting the store are clerks of the store; if so, the current statistical value of the customer flow volume is adjusted to obtain an adjusted value of the customer flow volume, and in particular, the current statistical value is decreased by 1 to obtain the adjusted value of the customer flow volume; and the adjusted value of the customer flow volume is taken as the actual value of the customer flow volume of the store, and the actual value is uploaded to a background server.

By means of the embodiment of the present application, the count of the store's clerks incoming or outgoing can be removed, and then a basically correct count only for customers entering and exiting the store can be obtained, such that the statistical result is more real and effective.

In addition, the aforesaid webcam IPC can be a WiFi probe IPC, i.e. a webcam fusing with WiFi probe technology, an apparatus provided with the function of wireless signal detection and capture, video capture, video analysis, target counting and network transmission, and it includes a WiFi probe. The WiFi probe can detect MAC address information of a WiFi apparatus.

Embodiment 3

According to an embodiment of the present application, an embodiment of a statistical device for customer flow volume is provided.

Figure 4:
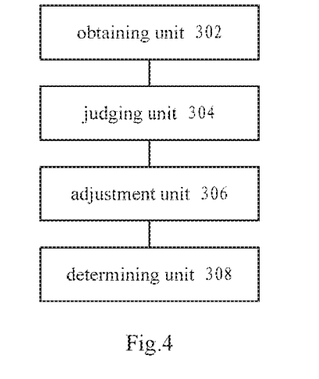
FIG. 4 is a schematic diagram of an optional statistical device for customer flow volume according to an embodiment of the present application.

FIG. 4 is a schematic diagram of an optional statistical device for customer flow volume according to an embodiment of the present application. As shown in FIG. 4, the device includes an obtaining unit 302, a judging unit 304, an adjustment unit 306 and a determining unit 308. The obtaining unit 302 is used for obtaining a current statistical value of customer flow volume in a preset monitoring area, the current statistical value of the customer flow volume being a difference between the number of the detected persons appearing in the preset monitoring area and the number of the detected persons disappearing from the preset monitoring area so far; the judging unit 304 is used for judging whether the detected persons appearing in the preset monitoring area and the detected persons disappearing from the preset monitoring area meet a preset attribute condition; the adjustment unit 306 is used for, when it is judged that the detected persons appearing in the preset monitoring area and the detected persons disappearing from the preset monitoring area meet the preset attribute condition, adjusting the current statistical value of the customer flow volume to obtain an adjusted value of the customer flow volume; and the determining unit 308 is used for taking the adjusted value of the customer flow volume as the actual value of the customer flow volume in the preset monitoring area.

Taking an IPC provided at a doorway of a store as an example, the present application is set forth in detail below.

When being implemented, the IPC can perform intelligent analysis through video mode recognition by obtaining, through statistics, a video customer flow volume in order to obtain, through statistics, the number of persons entering and exiting the preset area, i.e. to obtain the current statistical value of the customer flow volume in the store, wherein the current statistical value of the customer flow volume in the store is a difference between the number of the detected customers appearing in the store and the number of the detected customers exiting the store so far; further, the IPC judges whether the detected persons appearing in the store and the detected persons exiting the store are clerks of the store; if so, the current statistical value of the customer flow volume is adjusted to obtain an adjusted value of the customer flow volume, and in particular, the current statistical value is decreased by 1 to obtain the adjusted value of the customer flow volume; and the adjusted value of the customer flow volume is taken as the actual value of the customer flow volume of the store, and the actual value is uploaded to a background server.

By means of the embodiment of the present application, since it is possible to further determine the information of persons resulting in the customer flow volume in the preset monitoring area, it is possible not only to increase the number of incoming persons by 1 when someone enters and increase the number of outgoing persons by 1 when someone exists, but also to identify who enters or exits the preset area. Particularly in the present application of obtaining, through statistics, customer flow volume in a store, with the present application, it is possible to effectively prevent such cases that the number of incoming persons and the number of outgoing persons continuously increase in the customer flow volume statistics and the statistical result distorts because clerks of the store pass the doorway again and again, so that the obtained statistical number really represents the number of incoming and outgoing customers. That is, by means of the embodiment of the present application, it is possible to further determine the personal information of a person on which a statistical operation is performed, and then remove the effect of persons meeting a preset attribute condition on the statistical result, thereby achieving the technical effect of improving the accuracy of the statistical result.

Optionally, the judging unit is further used to judge whether the detected person appearing in the preset monitoring area and the detected person disappearing from the preset monitoring area meet a preset attribute condition by means of the following function modules: a detection module for judging whether a WiFi terminal apparatus carried by the detected person appearing in the preset monitoring area and a WiFi terminal apparatus carried by the detected person disappearing from the preset monitoring area are preset terminals, wherein if it is judged that the WiFi terminal apparatus carried by the detected person appearing in the preset monitoring area and the WiFi terminal apparatus carried by the detected person disappearing from the preset monitoring area are preset terminals, it indicates that the detected person appearing in the preset monitoring area and the detected person disappearing from the preset monitoring area meet the preset attribute condition; if it is judged that the WiFi terminal apparatus carried by the detected person appearing in the preset monitoring area and the WiFi terminal apparatus carried by the detected person disappearing from the preset monitoring area are not preset terminals, it indicates that the detected person appearing in the preset monitoring area and the detected person disappearing from the preset monitoring area do not meet the preset attribute condition.

Specifically, it is possible to use the terminals of the persons meeting the preset attribute condition as a preset terminal, and register the information of these preset terminals in the management terminal of the aforesaid preset area, and when being implemented, it is possible to download the information of these preset terminals to the IPC.

By means of the embodiment of the present application, it is possible to determine whether a terminal apparatus carried by a person entering or exiting a preset area is a preregistered preset terminal in order to determine whether the person is a person meeting the preset attribute condition, thereby achieving the object of facilitating recognition.

Optionally, the detection module is further used for judging whether the address information of the WiFi terminal apparatus carried by the detected person appearing in the preset monitoring area and the address information of the WiFi terminal apparatus carried by the detected person disappearing from the preset monitoring area are preset address information.

Specifically, it is possible to use the terminals of the persons meeting the preset attribute condition as a preset terminal, and register the address information (for example, MAC address information) of these preset terminals in the management terminal of the aforesaid preset area, and when being implemented, it is possible to download the address information (for example, MAC address information) of these preset terminals to the IPC.

By means of the embodiment of the present application, since it is easy to detect address information (for example, MAC address information) of terminals, the object of simplifying operation is achieved by determining whether the address information of the terminal carried by a person entering or exiting a preset area is preregistered address information of the preset terminal to determine whether the person is a person meeting the preset attribute condition.

Optionally, the detection module is further used for judging whether the address information of the WiFi terminal apparatus carried by the detected person appearing in the preset monitoring area and the address information of the WiFi terminal apparatus carried by the detected person disappearing from the preset monitoring area are preset address information by means of a WiFi detector.

For example, the WiFi detector can be a WiFi probe, and the hardware modules thereof can include a communication module for providing a network access function for a preset area, receiving cellphone MAC white list information and the like issued by the management terminal, and uploading customer flow volume statistical data and video image data; a WiFi detection module for sensing and detecting whether a cellphone MAC address and the like appears, in particular, sensing the doorway and the inside of the store covered by the area; a storage module for storing cellphone MAC white list information and customer flow volume statistical data within a period of time. It should be noted that the above white list can be a list which records MAC address information of the WiFi apparatus in advance.

By means of the embodiment of the present application, which uses a manner of combining wireless sensing and video obtaining and determining to adjust the number of incoming persons and the number of outgoing persons within the preset monitoring area such as a store or the like and exclude the number of incoming persons and the number of outgoing persons which meet a preset attribute condition (for example, clerks or the like), it is ensured that the obtained statistical value of the customer flow volume is authentic and reliable.

Optionally, the above obtaining unit can include an obtaining module, a first determining module, a second determining module and a computing module. The obtaining module is used for obtaining video image information in a preset monitoring area; the first determining module is used for determining the movement directions of various persons in the preset monitoring area according to the video image in the preset monitoring area; the second determining module is used for determining the number of the determined persons appearing in the preset monitoring area and the number of the determined persons disappearing from the preset monitoring area according to the determined movement directions of the various persons in the preset monitoring area; and the computing module is used for computing the current statistical value of the customer flow volume according the number of the determined persons appearing in the preset monitoring area and the number of the determined persons disappearing from the preset monitoring area.

Corresponding to the above method embodiment, an embodiment of the present application provides a statistical device for customer flow volume including:

a first video image obtaining unit for obtaining video image information in a preset monitoring area;

a first movement direction determining unit for performing video analysis on the video image information and determining a movement direction of a first target person appearing in the preset monitoring area according to an analysis result, the movement direction being a direction of entering an actual detection area of a wireless detector or a direction of exiting the actual detection area, wherein the actual detection area covers the preset monitoring area;

a first statistical unit for customer flow volume, for obtaining, through statistics, incoming customer flow volume or outgoing customer flow volume of the actual detection area according to the determined movement direction of the first target person;

a first terminal identifier reading unit, for reading a first terminal identifier, detected by a WiFi detector, of a WiFi terminal apparatus carried by the first target person;

a first judging unit for judging whether the first terminal identifier is present in a preset terminal identifier database for non-customer personnel, if so, decreasing the incoming customer flow volume or the outgoing customer flow volume by 1; otherwise, making no change to the incoming customer flow volume or the outgoing customer flow volume.

It should be noted that each of the first video image obtaining unit, the first movement direction determining unit, the first statistical unit for customer flow volume, the first terminal identifier reading unit and the first judging unit in the embodiment can be a unit running in a webcam, or can also be a unit running in a management terminal; of course, the various modules included by the statistical device for customer flow volume in the embodiment can also run in different apparatuses, for example, the first video image obtaining unit can run in a webcam, while the remaining units can run in a management terminal; or the first video image obtaining unit, the first movement direction determining unit and the first statistical unit for customer flow volume can run in a webcam while the remaining units can run in a management terminal, and so on.

A statistical device for customer flow volume provided by the embodiment can effectively prevent such cases that the number of incoming persons and the number of outgoing persons continuously increase in the customer flow volume statistics and the statistical result distorts because clerks of the store pass the doorway again and again, so that the obtained statistical number really represents the number of incoming and outgoing customers. That is, by means of embodiments of the present application, it is possible to achieve the object of further determining personal information of a person on which a statistical operation is performed, thereby eliminating the influence of the person meeting a preset attribute condition on the statistical result, and achieving the technical effect of improving the accuracy of the statistical result.

Corresponding to the above method embodiment, an embodiment of the present application further provides a statistical device for customer flow volume including:

a second video image obtaining unit for obtaining video image information in a preset monitoring area:

a second movement direction determining unit for performing video analysis on the video image information and determining a movement direction of a first target person appearing in the preset monitoring area according to an analysis result, the movement direction including an incoming direction or an outgoing direction;

a second terminal identifier reading unit for obtaining a first terminal identifier of a WiFi terminal apparatus carried by the first target person through a WiFi detector, wherein an actual detection area of the WiFi detector covers the preset monitoring area;

a second judging unit for judging whether the first terminal identifier is present in a preset terminal identifier database for non-customer personnel; if not, increasing the incoming customer flow volume or the outgoing customer flow volume by 1 according to the movement direction of the first target person; if so, making no change to the incoming customer flow volume or the outgoing customer flow volume.

It should be noted that each of the second video image obtaining unit, the second movement direction determining unit, the second terminal identifier reading unit and the second judging unit in the embodiment can be a unit running in a webcam, or can also be a unit running in a management terminal; of course, the various modules included by the statistical device for customer flow volume in the embodiment can also run in different apparatuses, for example, the second video image obtaining unit can run in a webcam, while the remaining units can run in a management terminal; or the second video image obtaining unit and the second movement direction determining unit can run in a webcam while the remaining units can run in a management terminal, and so on.

A statistical device for customer flow information provided by the embodiment can effectively prevent such cases that the number of incoming persons and the number of outgoing persons continuously increase in the customer flow volume statistics and the statistical result distorts because clerks of the store pass the doorway again and again, so that the obtained statistical number really represents the number of incoming and outgoing customers. That is, by means of embodiments of the present application, it is possible to achieve the object of further determining personal information of a person on which a statistical operation is performed, thereby eliminating the influence of the person meeting a preset attribute condition on the statistical result, and achieving the technical effect of improving the accuracy of the statistical result.

Corresponding to the above method embodiment, an embodiment of the present application further provides a storage medium for storing an application program for implementing a statistical method for customer flow volume provided by an embodiment of the present application when in operation. Specifically, the statistical method for customer flow volume provided by an embodiment of the present application can include:

obtaining video image information in a preset monitoring area;

performing video analysis on the video image information and determining a movement direction of a first target person appearing in the preset monitoring area according to an analysis result, the movement direction being a direction of entering an actual detection area of a wireless detector or a direction of exiting the actual detection area, wherein the actual detection area covers the preset monitoring area:

obtaining, through statistics, incoming customer flow volume or outgoing customer flow volume of the actual detection area according to the determined movement direction of the first target person:

reading a first terminal identifier, detected by a WiFi detector, of a WiFi terminal apparatus carried by the first target person:

judging whether the first terminal identifier is present in a preset terminal identifier database for non-customer personnel;

if so, decreasing the incoming customer flow volume or the outgoing customer flow volume by 1;

otherwise, making no change to the incoming customer flow volume or the outgoing customer flow volume.

In the present embodiment, the storage medium stores the application program which implements the statistical method for customer flow volume provided by an embodiment of the present application when in operation, and thereby can effectively prevent such cases that the number of incoming persons and the number of outgoing persons continuously increase in the customer flow volume statistics and the statistical result distorts because clerks of the store pass the doorway again and again, so that the obtained statistical number really represents the number of incoming and outgoing customers. That is, by means of embodiments of the present application, it is possible to achieve the object of further determining personal information of a person on which a statistical operation is performed, thereby achieving elimination of the influence of the person meeting a preset attribute condition on the statistical result, and achieving the technical effect of improving the accuracy of the statistical result.

Corresponding to the above method embodiment, an embodiment of the present application further provides a storage medium for storing an application program for implementing another statistical method for customer flow volume provided by an embodiment of the present application when in operation. Specifically, this statistical method for customer flow volume provided by an embodiment of the present application can include:

obtaining video image information in a preset monitoring area:

performing video analysis on the video image information and determining a movement direction of a first target person appearing in the preset monitoring area according to an analysis result, the movement direction including an incoming direction or an outgoing direction:

obtaining a first terminal identifier of a WiFi terminal apparatus carried by the first target person through a WiFi detector, wherein an actual detection area of the WiFi detector covers the preset monitoring area;

judging whether the first terminal identifier is present in a preset terminal identifier database for non-customer personnel;

if not, increasing incoming customer flow volume or outgoing customer flow volume by 1 according to the movement direction of the first target person:

if so, making no change to the incoming customer flow volume or the outgoing customer flow volume.

In the present embodiment, the storage medium stores the application program which implements the statistical method for customer flow volume provided by an embodiment of the present application when in operation, and thereby can effectively prevent such cases that the number of incoming persons and the number of outgoing persons continuously increase in the customer flow volume statistics and the statistical result distorts because clerks of the store pass the doorway again and again, so that the obtained statistical number really represents the number of incoming and outgoing customers. That is, by means of embodiments of the present application, it is possible to achieve the object of further determining personal information of a person on which a statistical operation is performed, thereby eliminating the influence of the person meeting a preset attribute condition on the statistical result, and achieving the technical effect of improving the accuracy of the statistical result.

Corresponding to the above method embodiment, an embodiment of the present application further provides an application program for implementing a statistical method for customer flow volume provided by an embodiment of the present application when in operation. Specifically, the statistical method for customer flow volume provided by an embodiment of the present application can include:

obtaining video image information in a preset monitoring area:

performing video analysis on the video image information and determining a movement direction of a first target person appearing in the preset monitoring area according to an analysis result, the movement direction being a direction of entering an actual detection area of a wireless detector or a direction of exiting the actual detection area, wherein the actual detection area covers the preset monitoring area:

obtaining, through statistics, incoming customer flow volume or outgoing customer flow volume of the actual detection area according to the determined movement direction of the first target person:

reading a first terminal identifier, detected by a WiFi detector, of a WiFi terminal apparatus carried by the first target person;

judging whether the first terminal identifier is present in a preset terminal identifier database for non-customer personnel;

if so, decreasing the incoming customer flow volume or the outgoing customer flow volume by 1;

otherwise, making no change to the incoming customer flow volume or the outgoing customer flow volume.

In the present embodiment, the application program implements the statistical method for customer flow volume provided by an embodiment of the present application when in operation, and thereby can effectively prevent such cases that the number of incoming persons and the number of outgoing persons continuously increase in the customer flow volume statistics and the statistical result distorts because clerks of the store pass the doorway again and again, so that the obtained statistical number really represents the number of incoming and outgoing customers. That is, by means of embodiments of the present application, it is possible to achieve the object of further determining personal information of a person on which a statistical operation is performed, thereby eliminating the influence of the person meeting a preset attribute condition on the statistical result, and achieving the technical effect of improving the accuracy of the statistical result.

Corresponding to the above method embodiment, an embodiment of the present application further provides an application program for implementing another statistical method for customer flow volume provided by an embodiment of the present application when in operation. Specifically, this statistical method for customer flow volume provided by an embodiment of the present application can include:

obtaining video image information in a preset monitoring area:

performing video analysis on the video image information and determining a movement direction of a first target person appearing in the preset monitoring area according to an analysis result, the movement direction including an incoming direction or an outgoing direction:

obtaining a first terminal identifier of a WiFi terminal apparatus carried by the first target person through a WiFi detector, wherein an actual detection area of the WiFi detector covers the preset monitoring area;

judging whether the first terminal identifier is present in a preset terminal identifier database for non-customer personnel;

if not, increasing incoming customer flow volume or outgoing customer flow volume by 1 according to the movement direction of the first target person;

if so, making no change to the incoming customer flow volume or the outgoing customer flow volume.

In the present embodiment, the application program implements the statistical method for customer flow volume provided by an embodiment of the present application when in operation, and thereby can effectively prevent such cases that the number of incoming persons and the number of outgoing persons continuously increase in the customer flow volume statistics and the statistical result distorts because clerks of the store pass the doorway again and again, so that the obtained statistical number really represents the number of incoming and outgoing customers. That is, by means of embodiments of the present application, it is possible to achieve the object of further determining personal information of a person on which a statistical operation is performed, thereby eliminating the influence of the person meeting a preset attribute condition on the statistical result, and achieving the technical effect of improving the accuracy of the statistical result.

Corresponding to the above method embodiments, an embodiment of the present application further provides an electronic apparatus including: a processor, a memory, a communication interface and a bus;

the processor, the memory and the communication interface being connected and communicated with each other via the bus;

the memory storing an executable program code;

the processor executing a program corresponding to the executable program code by reading the executable program code stored in the memory, so as to implement a statistical method for customer flow volume provided by an embodiment of the present application; specifically, the statistical method for customer flow volume provided by an embodiment of the present application can include:

obtaining video image information in a preset monitoring area;

performing video analysis on the video image information and determining a movement direction of a first target person appearing in the preset monitoring area according to an analysis result, the movement direction being a direction of entering an actual detection area of a wireless detector or a direction of exiting the actual detection area, wherein the actual detection area covers the preset monitoring area;

obtaining, through statistics, incoming customer flow volume or outgoing customer flow volume of the actual detection area according to the determined movement direction of the first target person;

reading a first terminal identifier, detected by a WiFi detector, of a WiFi terminal apparatus carried by the first target person;

judging whether the first terminal identifier is present in a preset terminal identifier database for non-customer personnel;

if so, decreasing the incoming customer flow volume or the outgoing customer flow volume by 1;

otherwise, making no change to the incoming customer flow volume or the outgoing customer flow volume.

It should be noted that the specific product mode of the electronic apparatus can be a webcam or a management terminal, but of course, is not limited thereto, and any apparatus and a combination of apparatuses which can implement the above function steps are feasible.

In the present embodiment, the processor of the electronic apparatus runs a program corresponding to an executable program code by reading the executable program code stored in the memory, the program implementing the statistical method for customer flow volume provided by an embodiment of the present application when in operation, and thereby can effectively prevent such cases that the number of incoming persons and the number of outgoing persons continuously increase in the customer flow volume statistics and the statistical result distorts because clerks of the store pass the doorway again and again, so that the obtained statistical number really represents the number of incoming and outgoing customers. That is, by means of embodiments of the present application, it is possible to achieve the object of further determining personal information of a person on which a statistical operation is performed, thereby eliminating the influence of the person meeting a preset attribute condition on the statistical result, and achieving the technical effect of improving the accuracy of the statistical result.

Corresponding to the above method embodiments, an embodiment of the present application further provides an electronic apparatus including: a processor, a memory, a communication interface and a bus;

the processor, the memory and the communication interface being connected and communicated with each other via the bus;

the memory storing an executable program code;

the processor executing a program corresponding to the executable program code by reading the executable program code stored in the memory, so as to implement another statistical method for customer flow volume provided by an embodiment of the present application; specifically, this statistical method for customer flow volume provided by an embodiment of the present application can include:

obtaining video image information in a preset monitoring area:

performing video analysis on the video image information and determining a movement direction of a first target person appearing in the preset monitoring area according to an analysis result, the movement direction including an incoming direction or an outgoing direction:

obtaining a first terminal identifier of a WiFi terminal apparatus carried by the first target person through a WiFi detector, wherein an actual detection area of the WiFi detector covers the preset monitoring area;

judging whether the first terminal identifier is present in a preset terminal identifier database for non-customer personnel;

if not, increasing incoming customer flow volume or outgoing customer flow volume by 1 according to the movement direction of the first target person:

if so, making no change to the incoming customer flow volume or the outgoing customer flow volume.

It should be noted that the specific product mode of the electronic apparatus can be a webcam or a management terminal, but of course, is not limited thereto, and any apparatus and combination of apparatuses which can implement the above function steps are feasible.

In the present embodiment, the processor of the electronic apparatus runs a program corresponding to an executable program code by reading the executable program code stored in the memory, the program implementing the statistical method for customer flow volume provided by an embodiment of the present application when in operation, and thereby can effectively prevent such cases that the number of incoming persons and the number of outgoing persons continuously increase in the customer flow volume statistics and the statistical result distorts because clerks of the store pass the doorway again and again, so that the obtained statistical number really represents the number of incoming and outgoing customers. That is, by means of embodiments of the present application, it is possible to achieve the object of further determining personal information of a person on which a statistical operation is performed, thereby eliminating the influence of the person meeting a preset attribute condition on the statistical result, and achieving the technical effect of improving the accuracy of the statistical result.

In addition, it should be emphasized that, for the embodiments of an electronic apparatus, an application program and a storage medium, the description thereof is relatively simple since its related method content is substantially similar to that of the aforesaid embodiments of a method, and for the related parts, reference can be made to the embodiments of a method.

The sequence numbers of the aforesaid embodiments of the present application are only for the purpose of description, but do not represent the good and bad of the embodiments.

In the above embodiments of the present application, each embodiment has the respective emphasis, and for a part which is not described in detail in an embodiment, reference can be made to the related description in other embodiments.

In several embodiments provided by the present application, it should be appreciated that the disclosed technical content can be implemented in another manner. Wherein the above described embodiment of a device is only schematic. For example, the division of units can be a logic function division, and when implemented actually, they can be divided in another manner. For example, a plurality of units or components can be combined or can be integrated into another system, or otherwise, some features can be ignored or not be implemented. On the other hand, the coupling or direct coupling or communication connection with each other as shown or discussed can be indirect coupling or communication connection via some interfaces, units or modules, and can be in an electrical or another form.

The units described as separated parts may be or may not be physically separated, the parts shown as units may be or may not be physical units, i.e. can be located at one position or can be distributed in a plurality of units. It is possible to select a part or all of the units therein to implement the object of the embodiments according to actual needs.

In addition, various functional units in various embodiments of the present application can be integrated in a processing unit, or various units can also be physically present individually, or two or more of the units can integrated in one unit. The aforesaid integrated unit can be implemented in the form of hardware, and can also be implemented in the form of a software functional unit.

When implemented in a software functional unit and sold or used as an individual product, the integrated unit can be stored in a computer readable storage medium. Based on such understanding, the essential technical solution of the present application or the part which makes contributions to the prior art, or all or parts of the technical solution can be embodied as a software product which is stored in a storage medium and includes several instructions to enable a computer device (such as a personal computer, a server or a network apparatus) to implement all or parts of the steps of the methods of various embodiments of the present application. And the aforesaid storage medium can include various media which can store program codes, such as a USB disk, a read-only memory (ROM), a random access memory (RAM), a mobile hard disk, a magnetic disk or optical disk.

The embodiments described above are just preferable embodiments of the present application, and are not indented to limit the present application. Any modifications, alternatives, improvements or the like within the spirit and principle of the present application shall be included in the protection scope of the present application.

What is claimed is:

1. A statistical method for customer flow volume, wherein the method comprises:
    obtaining video image information in a preset monitoring area;
    performing video analysis on the video image information and determining a movement direction of a first target person appearing in the preset monitoring area according to an analysis result, the movement direction being a direction of entering an actual detection area of a wireless detector or a direction of exiting the actual detection area, wherein the actual detection area covers the preset monitoring area;
    obtaining, through statistics, incoming customer flow volume or outgoing customer flow volume of the actual detection area according to the determined movement direction of the first target person;
    reading a first terminal identifier, detected by a WiFi detector, of a WiFi terminal apparatus carried by the first target person;
    judging whether the first terminal identifier is present in a preset terminal identifier database for non-customer personnel;
    if so, decreasing the incoming customer flow volume or the outgoing customer flow volume by 1;
    otherwise, making no change to the incoming customer flow volume or the outgoing customer flow volume.

2. The method of claim 1, wherein
    the video image information in the preset monitoring area is obtained by a webcam;
    the webcam performs video analysis on the video image information and determines the movement direction of the first target person appearing in the preset monitoring area according to the analysis result;
    the webcam obtains, through statistics, the incoming customer flow volume or the outgoing customer flow volume of the actual detection area according to the determined movement direction of the first target person;
    the webcam judges whether the first terminal identifier is present in the preset terminal identifier database for non-customer personnel;
    if so, the webcam decreases the incoming customer flow volume or the outgoing customer flow volume by 1;
    otherwise, the webcam makes no change to the incoming customer flow volume or the outgoing customer flow volume.

3. The method of claim 2, wherein the WiFi detector is provided in the webcam, or the WiFi detector is independent from the webcam.

4. The method of claim 1, wherein
    the video image information in the preset monitoring area is obtained by a management terminal;
    the management terminal performs video analysis on the video image information and determines the movement direction of the first target person appearing in the preset monitoring area according to the analysis result;

the management terminal obtains, through statistics, the incoming customer flow volume or the outgoing customer flow volume of the actual detection area according to the determined movement direction of the first target person;

the management terminal judges whether the first terminal identifier is present in the preset terminal identifier database for non-customer personnel;

if so, the management terminal decreases the incoming customer flow volume or the outgoing customer flow volume by 1;

otherwise, the management terminal makes no change to the incoming customer flow volume or the outgoing customer flow volume.

5. The method of claim 1, wherein the first terminal identifier of the WiFi terminal apparatus is MAC address information.

6. The method of claim 1, wherein, when the movement direction is a direction of exiting the actual detection area, before decreasing the outgoing customer flow volume by 1 accordingly, the method further comprises:

judging whether a time duration, for which the first terminal identifier detected by the WiFi detector has disappeared from the actual detection area, reaches a preset value;

if so, performing the step of decreasing the outgoing customer flow volume by 1 accordingly.

7. The method of claim 1, wherein after obtaining, through statistics, incoming customer flow volume or outgoing customer flow volume of the actual detection area, the method further comprises:

reading the number of times of entering the actual detection area or the number of times of exiting the actual detection area for the first target person within a preset time period;

judging whether the number of times of entering the actual detection area or the number of times of exiting the actual detection area exceeds a preset threshold;

if so, subtracting the number of times of entering the actual detection area from the incoming customer flow volume to obtain an actual incoming customer flow volume, or subtracting the number of times of exiting the actual detection area from the outgoing customer flow volume to obtain an actual outgoing customer flow volume.

8. A non-transitory storage medium, wherein the non-transitory storage medium is used for storing an application program for implementing the statistical method for customer flow volume according to claim 1 when in operation.

9. An electronic apparatus, wherein the electronic apparatus comprises: a processor, a memory, a communication interface and a bus;

the processor, the memory and the communication interface being connected and communicated with each other via the bus;

the memory storing an executable program code;

the processor executing a program corresponding to the executable program code by reading the executable program code stored in the memory, so as to implement the statistical method for customer flow volume according to claim 1.

10. A statistical method for customer flow volume, wherein the method comprises:

obtaining video image information in a preset monitoring area;

performing video analysis on the video image information and determining a movement direction of a first target person appearing in the preset monitoring area according to an analysis result, the movement direction comprising an incoming direction or an outgoing direction;

obtaining a first terminal identifier of a WiFi terminal apparatus carried by the first target person through a WiFi detector, wherein an actual detection area of the WiFi detector covers the preset monitoring area;

judging whether the first terminal identifier is present in a preset terminal identifier database for non-customer personnel;

if not, increasing incoming customer flow volume or outgoing customer flow volume by 1 according to the movement direction of the first target person;

if so, making no change to the incoming customer flow volume or the outgoing customer flow volume.

11. A non-transitory storage medium, wherein the non-transitory storage medium is used for storing an application program for implementing the statistical method for customer flow volume according to claim 10 when in operation.

12. An electronic apparatus, wherein the electronic apparatus comprises: a processor, a memory, a communication interface and a bus;

the processor, the memory and the communication interface being connected and communicated with each other via the bus;

the memory storing an executable program code;

the processor executing a program corresponding to the executable program code by reading the executable program code stored in the memory, so as to implement the statistical method for customer flow volume according to claim 10.

* * * * *